United States Patent
Day-Richter et al.

(10) Patent No.: US 9,195,840 B2
(45) Date of Patent: Nov. 24, 2015

(54) APPLICATION-SPECIFIC FILE TYPE GENERATION AND USE

(75) Inventors: John Day-Richter, Denver, CO (US); Brian Lewis Cairns, Boulder, CO (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/453,334

(22) Filed: Apr. 23, 2012

(65) Prior Publication Data
US 2013/0282752 A1   Oct. 24, 2013

(51) Int. Cl.
G06F 17/30   (2006.01)
G06F 21/62   (2013.01)
G06F 21/44   (2013.01)

(52) U.S. Cl.
CPC .......... *G06F 21/62* (2013.01); *G06F 17/30722* (2013.01); *G06F 21/44* (2013.01)

(58) Field of Classification Search
None
See application file for complete search history.

(56) References Cited

U.S. PATENT DOCUMENTS

| | | |
|---|---|---|
| 7,263,688 B2 | 8/2007 | Pitzel et al. |
| 7,680,932 B2 | 3/2010 | Defaix et al. |
| 7,689,633 B1 | 3/2010 | Li et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,779,113 B1 | 8/2010 | Samar |
| 7,827,201 B1 | 11/2010 | Gordon et al. |
| 7,917,888 B2 | 3/2011 | Chong et al. |
| 7,941,419 B2 | 5/2011 | Bhatkar et al. |
| 7,996,380 B2 | 8/2011 | Arrouye et al. |
| 8,108,427 B2 | 1/2012 | Prahlad et al. |
| 8,131,723 B2 | 3/2012 | Sim-Tang |
| 8,151,323 B2 | 4/2012 | Harris et al. |
| 8,250,455 B2 | 8/2012 | Kadowaki et al. |
| 8,341,708 B1 | 12/2012 | Eatough et al. |
| 8,346,781 B1 | 1/2013 | Cornelius |
| 8,364,759 B2 | 1/2013 | Moromisato et al. |
| 8,386,478 B2 | 2/2013 | Wang |
| 8,468,455 B2 | 6/2013 | Jorgensen et al. |
| 8,478,817 B2 | 7/2013 | Duggal |
| 8,504,689 B2 | 8/2013 | Ferris et al. |
| 8,522,137 B1 | 8/2013 | Brown et al. |
| 8,572,033 B2 | 10/2013 | Shukla |

(Continued)

FOREIGN PATENT DOCUMENTS

| | | |
|---|---|---|
| KR | 10-2010-0137323 | 12/2010 |
| KR | 10-2012-0010397 | 2/2012 |

OTHER PUBLICATIONS http://web.archive.org/web/20120819143535/https://addons.mozilla.org/en-US/firefox/extensions/?sort=featured, printed Dec. 13, 2013, 3 pages.

(Continued)

*Primary Examiner* — Miranda Huang
(74) *Attorney, Agent, or Firm* — Ropes & Gray LLP

(57) ABSTRACT

Techniques are described for facilitating file access control of a storage service. In response to a third-party application requesting access to a user's file, the service extracts an application-specific ID from a file type associated with the retrieved file; and grants access to the requested file in response to a determination that an application-specific ID for the third-party application matches an application-specific ID extracted from the file. This Abstract is submitted with the understanding that it will not be used to interpret or limit the scope or meaning of the claims.

22 Claims, 4 Drawing Sheets

(56) References Cited

U.S. PATENT DOCUMENTS

| | | | |
|---|---|---|---|
| 8,706,800 | B1 | 4/2014 | Ahmed et al. |
| 8,812,627 | B2 | 8/2014 | Donahue et al. |
| 8,856,176 | B1 | 10/2014 | Venu et al. |
| 2003/0033369 | A1 | 2/2003 | Bernhard |
| 2003/0126592 | A1* | 7/2003 | Mishra et al. ............... 717/176 |
| 2004/0205358 | A1* | 10/2004 | Erickson .................... 713/200 |
| 2005/0243760 | A1 | 11/2005 | Yoshioka |
| 2005/0289538 | A1 | 12/2005 | Black-Ziegelbein et al. |
| 2006/0005168 | A1 | 1/2006 | Singh |
| 2006/0070029 | A1 | 3/2006 | Laborczfalvi et al. |
| 2006/0074837 | A1* | 4/2006 | Braddy et al. ................ 707/1 |
| 2007/0106984 | A1 | 5/2007 | Birk Olsen et al. |
| 2007/0192739 | A1 | 8/2007 | Hunleth et al. |
| 2007/0254631 | A1 | 11/2007 | Spooner |
| 2008/0033921 | A1 | 2/2008 | Arrouye et al. |
| 2008/0162493 | A1 | 7/2008 | Blohm et al. |
| 2008/0172720 | A1 | 7/2008 | Botz et al. |
| 2008/0184157 | A1 | 7/2008 | Selig |
| 2008/0189361 | A1 | 8/2008 | Greschler et al. |
| 2009/0083707 | A1 | 3/2009 | Fujita et al. |
| 2009/0210721 | A1 | 8/2009 | Phillips |
| 2009/0235352 | A1 | 9/2009 | Schrijen et al. |
| 2009/0249185 | A1 | 10/2009 | Datar et al. |
| 2009/0254572 | A1 | 10/2009 | Redlich et al. |
| 2009/0254580 | A1 | 10/2009 | Laurion |
| 2009/0288135 | A1 | 11/2009 | Chang et al. |
| 2010/0005529 | A1 | 1/2010 | Hemade |
| 2010/0088234 | A1* | 4/2010 | Moore et al. ................ 705/52 |
| 2010/0161762 | A1 | 6/2010 | Saxena |
| 2010/0257578 | A1 | 10/2010 | Shukla et al. |
| 2010/0274910 | A1 | 10/2010 | Ghanaie-Sichanie et al. |
| 2010/0281528 | A1 | 11/2010 | Hayton et al. |
| 2010/0325086 | A1 | 12/2010 | Skinner et al. |
| 2010/0325199 | A1 | 12/2010 | Park et al. |
| 2011/0066668 | A1 | 3/2011 | Guarraci |
| 2011/0093507 | A1 | 4/2011 | Pilip |
| 2011/0137979 | A1 | 6/2011 | Seo et al. |
| 2011/0154290 | A1 | 6/2011 | Kelly |
| 2011/0184993 | A1 | 7/2011 | Chawla et al. |
| 2011/0202672 | A1 | 8/2011 | Narayanaswamy et al. |
| 2011/0209045 | A1 | 8/2011 | Ghosh et al. |
| 2011/0231912 | A1 | 9/2011 | Lee et al. |
| 2011/0247074 | A1 | 10/2011 | Manring et al. |
| 2011/0252038 | A1 | 10/2011 | Schmidt et al. |
| 2011/0252071 | A1 | 10/2011 | Cidon |
| 2011/0258535 | A1 | 10/2011 | Adler, III et al. |
| 2012/0005159 | A1 | 1/2012 | Wang et al. |
| 2012/0095878 | A1 | 4/2012 | Feldman et al. |
| 2012/0099135 | A1 | 4/2012 | Ono |
| 2012/0110646 | A1 | 5/2012 | Ajitomi et al. |
| 2012/0144202 | A1* | 6/2012 | Counterman ............... 713/176 |
| 2012/0144454 | A1 | 6/2012 | Lee |
| 2012/0158668 | A1 | 6/2012 | Tu et al. |
| 2012/0173612 | A1* | 7/2012 | Vegesna-Venkata et al. . 709/203 |
| 2012/0179746 | A1 | 7/2012 | Bolgert et al. |
| 2012/0192067 | A1 | 7/2012 | DeLuca et al. |
| 2012/0254042 | A1 | 10/2012 | Ludemann |
| 2012/0266229 | A1 | 10/2012 | Simone et al. |
| 2013/0018904 | A1 | 1/2013 | Mankala et al. |
| 2013/0036455 | A1 | 2/2013 | Bodi et al. |
| 2013/0054356 | A1 | 2/2013 | Richman et al. |
| 2013/0086670 | A1 | 4/2013 | Vangpat et al. |
| 2013/0111336 | A1 | 5/2013 | Dorman et al. |
| 2013/0124606 | A1 | 5/2013 | Carpenter et al. |
| 2013/0144934 | A1 | 6/2013 | Swett et al. |
| 2013/0282755 | A1 | 10/2013 | Procopio et al. |
| 2013/0304797 | A1 | 11/2013 | Warren et al. |

OTHER PUBLICATIONS http://web.archive.org/web/20121020134710/https://addons.mozilla.org/en-US/seamonkey/extensions, printed Dec. 13, 2013, 3 pages.

http://web.archive.org/web/20121021135356/http:/support.mozilla.org/en-US/kb/find-and-install-add-ons-add-features-to-firefox, printed Dec. 13, 2013, 3 pages.

http://www-archive.mozilla.org/projects/webservices/, snapshot taken Apr. 21, 2008, printed Dec. 13, 2013, 4 pages.

https://addons.mozilla.org/EN-us/seamonkey/addon/gmail-smime/?src=search, printed Dec. 13, 2013, 2 pages.

http://web.archive.org/web/20110629120453/https://developer.mozilla.org/en/Setting_up_extension_development_environment, printed Jan. 9, 2015, 5 pages.

Mayer et al., "Third-Party Web Tracking: Policy and Technology," 12 Proceedings of the 2012 IEEE Symposium on Security and Privacy, pp. 413-427, May 20-23, 2012.

Nichols et al., High-Latency, Low-Bandwidth Windowing in the Jupiter Collaboration System, UIST '95. 8th Annual Symposium on User Interface Software and Technology. Proceedings of the ACM Symposium on User Interface Software and Technology,Nov. 14-17, 1995, 111-120.

Beresford et al., "MockDroid: Trading Privacy for Application Functionality on Smartphones," HotMobile '11 Mar. 1-3, 2011, Phoenix, AZ, USA.

Nauman et al., "Apex: Extending Android Permission Model and Enforcement with User-Defined Runtime Constraints," ASIACCS '10 Apr. 13-16, 2010 Beijing, China.

The Oauth 2.0 Authorization Protocol; draft letf-oauth-v2-24; Mar. 8, 2012.

Zhou et al., "Taming Information-Stealing Smartphone Applications (on Android)," LNCS 6740:93-107 (2011).

International Search Report for PCT/US2013/037773 dated Apr. 23, 2013.

Guo et al., "Building the PolarGrid Portal Using Web 2.0 and OpenSocial", Nov. 14-20, 2009 Portland, Oregon, USA; Copyright 2009 ACM, 8 pages.

http://web.archive.org/web/20111006093926/https://addons.mozilla.org/en-US/firefox/extensions/?sort=featured, printed Oct. 26, 2014, 9 pages.

http://web.archive.org/web/20111219132014/https://addons.mozilla.org/en-US/seamonkey, printed Oct. 26, 2014, 5 pages.

http://web.archive.org/web/20120512130530/https://developermozilla.org/en/Setting_up_extension_development_environment, 2012, 7 pages.

http://web.archive.org/web/20121020134710/https://addons.mozilla.org/en-US/seamonkey/extensions, printed Dec. 13, 2013, 3 pages.

http://web.archive.org/web/20121021135356/http://support.mozilla.org/en-US/kb/find-and-install-add-ons-add-features-to-firefox, printed Dec. 13, 2013, 3 pages.

http://web.archive.org/web20111226173518/http://en.wikipedia.org/wiki/Add-on_(Mozzila), printed Oct. 26, 2014, 5 pages.

https://addons.mozilla.org/en-US/firefox/addon/extension-manager-extended/, printed Oct. 26, 2014, 2 pages.

International Search Report and Written Opinion dated Jul. 28, 2014 in International Application No. PCT/US2014/029756, 11 pages.

International Search Report and Written Opinion dated Oct. 31, 2013 for Application No. PCT/US2013/047877, 9 pages.

International Search Report and Written Opinion dated Oct. 31, 2013 for Application No. PCT/US2014/032167, 11 pages.

International Search Report and Written Opinion dated Jun. 26, 2013 for Application No. PCT/US2013/037701, 10 pages.

Zissis et al., "Addressing Cloud Computing Security Issues", Future Generation Computer Systems 28 (2012) 583-592.

* cited by examiner

APPLICATION-SPECIFIC FILE TYPE GENERATION AND USE

BACKGROUND

Binary files use a particular, well-defined encoding that determines how the binary data in the file should be interpreted. For example, the JPEG image encoding standard describes a mapping between the binary data in an image file and a visual rendering of that image. A file format is used to specify how to convert the data contained in the file, typically binary data in 1s and 0s, to information useful to humans. One method of identifying the type of a file is to store information regarding the format in the file itself. Such information is placed in specific locations within the file, such as in metadata contained in a file header at the beginning of the file or elsewhere in the file. The headers, including file type information, can be human readable or binary.

In some document and file management systems, files or items in the system may be associated with standardized, generic typing information, for example, a "MIME type." Multipurpose Internet Mail Extensions (MIME) is an Internet Engineering Task Force (IETF) standard that describes a mechanism for specifying binary file encodings in a standardized way. A string that describes a binary file type is usually referred to as a "MIME type". MIME types were originally used to identifying what type of file was attached to an e-mail, independent of the operating system of the sender and recipient. MIME types are now used more generally to specify file types. File name extensions (e.g., ".txt" for plain text) is another way to specify the format of a file.

SUMMARY

Techniques are described for facilitating file access control of a storage service. In response to a third-party application requesting access to a user's file, the service extracts an application-specific ID from a file type associated with the retrieved file. The service grants access to the requested file in response to a determination that an application-specific ID for the third-party application matches an application-specific ID extracted from the file.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

Figure 1:
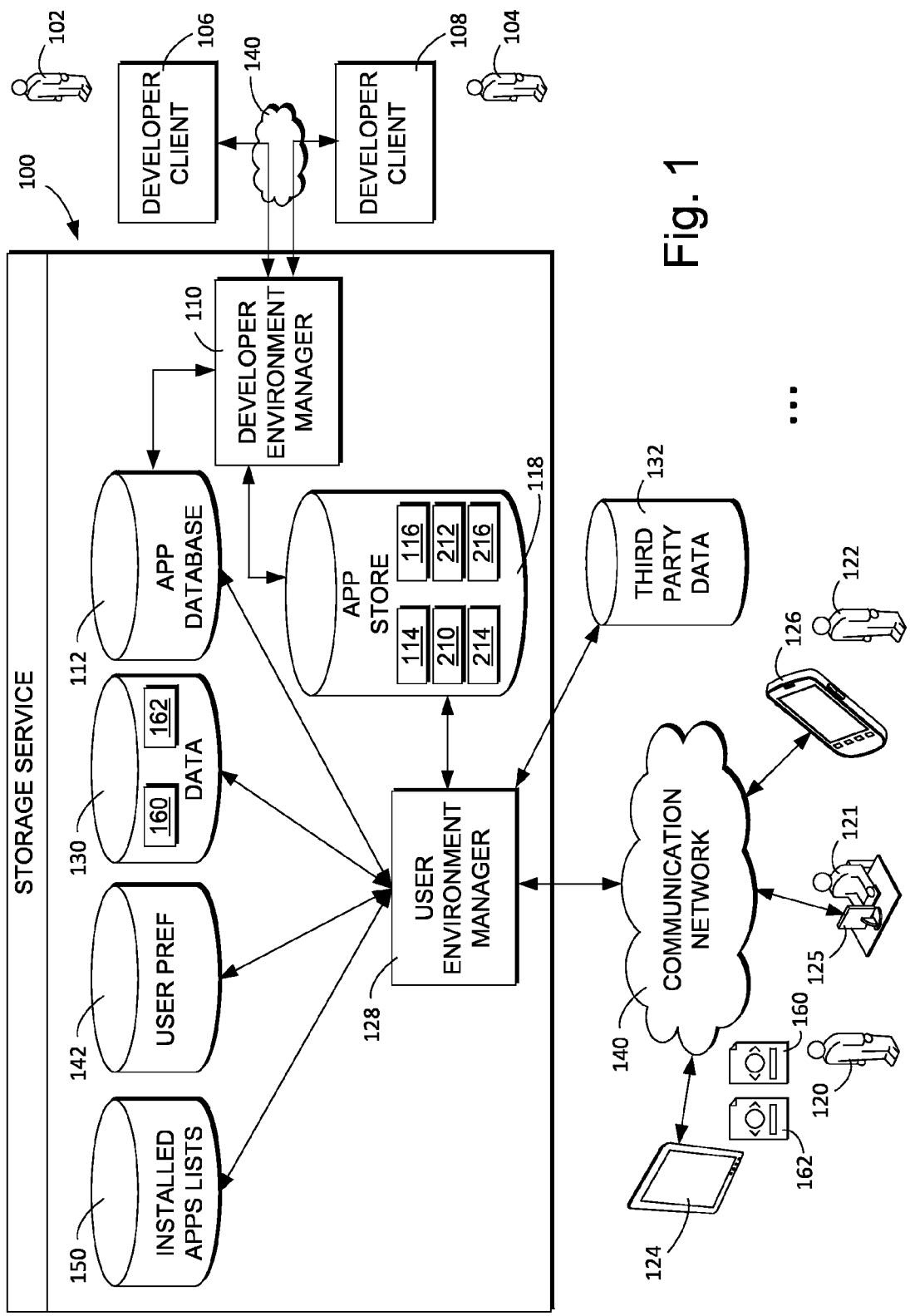
FIG. 1 is a schematic diagram of a system for application-specific file type generation and use in accordance with one or more implementations of the disclosure.

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The availability of cloud storage has greatly expanded. Cloud storage is a form of network storage which is available via the Internet. As used herein, network storage may include, for example, storage available via a network that may or may not comprise the Internet or be connected to the Internet. Data stored in the network storage may take the form of database content, user files, or other data content generally shared over a network. Hosting of the network storage typically occurs in large data centers and customers lease or use such network storage. The data center operators, in the background, virtualize the resources according to the requirements of the customer and expose them as storage pools, which the customers can themselves use to store files or data objects. Physically, the resource may span across multiple servers at multiple locations and may be replicated in various data centers proximate to the customers or their end users. These cloud storage services may be accessed through a web service application programming interface (API), or through a Web-based user interface.

A subset of this cloud or network storage is personal storage. Storage services provide an easy and convenient way to save any sort of files, including documents, photos and music files, on a network with a network-based storage service. The files are stored on the network where they are accessible substantially anywhere there is a network connection (e.g., an Internet connection in the case of cloud storage). If an original file is ever damaged or lost from a user's local hard drive, the file can be easily restored by the storage service. Some storage services also allow users to share files with others, typically through a link to a folder with the files are to be shared or through a direct link to the file.

Files typically can be accessed from a variety of types of computing devices, including, for example: computer workstations, mobile phones, video game consoles, laptops, tablet computers, or any other device that can access the Internet. Some network storage services are accessed through a web browser interface and others have proprietary interfaces that provide features designed to make uploading, accessing and sharing files more intuitive while also providing access to administrative functions like scheduling backups or creating sub-accounts for users.

For these file or data sharing services (i.e., cloud storage, and personal network storage), one problem is how to store a file. One way to store a file is to write the file to a persistent (e.g., electro or electro-mechanical) storage device in a binary encoding format. A file format is used to specify how to interpret the data contained in the binary file. In other words, the file format is used to specify how to make binary data in 1s and 0s into information useful to humans. At least three implementations of determining how to interpret a file are described herein. One method of identifying the type of a file is to store information regarding the format in the file itself or in an associated metadata record in a filesystem database (e.g., included in 128). Such information is placed in specific locations within the file, such as in metadata contained in a file header. The term header does not necessary mean at the beginning of the file. A file header can be elsewhere in the file. The header, including file type information, can be human readable or binary.

MIME is just one standard, of multiple possible standards, that specifies how to identify file types. MIME, Multipurpose Internet Mail Extensions, also know as Internet media type, is an Internet Engineering Task Force (IETF) standard that describes a mechanism for specifying binary file encodings in a standardized way. Aspects of MIME are described in several IETF standards documents such as RFC2045, RFC2046, RFC4288, and others. For MIME, the string that describes a binary file type is usually referred to as a "MIME type." For binary files, a well-defined encoding schema is used that determines how the binary data in the file should be interpreted. For example, an image encoding standard known as JPEG describes a mapping between the binary data in an image file and a visual rendering of that image. The MIME type for JPEG is image/jpeg. Several other MIME types exists for common, standardized file types such as a music file type known as MPEG Audio Layer III or MP3, a music file type known as MPEG-4 Part 14 or MP4, an image file type known as Graphics Interchange Format or GIF, a graphics file type known as portable network graphics or PNG, an image file type known as tagged image file format or TIFF, plain text, a file in a format known as hypertext markup language or HTML, a file in a format known as extensible markup language or XML, a file format known as portable document format or PDF, etc.

Some cloud or network storage systems provide applications to allow users, using only a web browser, to interact with documents stored on the network storage, without needing to have a full version of a software program installed on their local machine. As used herein, an "application" may include a software program that integrates with the storage system via APIs, or Application Programming Interfaces. For example, some network storage services allow documents to be opened and edited using a word processor provided by the network storage service. A user does not need to own or install a conventional full version of the word processor on his or her hard drive, but instead can edit files using only his or her browser.

While such applications are typically provided by the network storage service itself, various implementations described herein enable third-party developers to integrate their applications with a storage service or to allow their applications to be used with a network storage service. As used herein, a "third-party developer" may include a developer or supplier of software that is not the same as the owner or operator of the storage service.

Another technical problem for these file or data sharing services is how to grant access to others to these files or data. The granting of access to others to a particular set of data or a file can be complicated and may involve compromising security for that file or others stored with the file sharing service. A need exists to allow third parties access to user's files stored by these file or data network storage services when those services organize the stored files or data by MIME type. In particular, these third parties may need access to the file or data stored by the Internet-based storage service to open, create, edit, and modify stored files. Although many third-party software applications manipulate data stored in a pre-existing, standardized format, many other third-party applications manipulate data stored in a novel format determined by the third-party application.

The following description provides a solution to these needs and other problems, and offers other advantages over the prior art.

Third-Party Applications

In a storage service, which can be a file or data storage or sharing service or system, for a given file type, there may be multiple software applications capable of opening files of that type. Such software applications (apps) may include, for example, a combination of applications authored by or provided by the storage service proprietor or operator, by third parties, or both. The applications may include a universal default or system default software application, which is always installed, and is capable of opening or previewing, with some basic level of functionality, files of all types in the file or data sharing service system. Consider, for example, a portable network graphics or PNG image file. The system application is capable of previewing this file. However, third-party applications could allow for a richer preview experience. Some could even allow for an editing experience.

FIG. 1 illustrates an example network storage service 100 that may implement the described techniques for associating a file type with an application. The storage service 100 allows a third-party developer to supply web-based software applications for use by users of the storage service.

The applications are generally capable of opening, processing, viewing, or editing files of one or more file types. Third-party developers 102, 104, using client devices 106, 108 are able to integrate or register their applications into the storage service 100 using an interface provided for such integration and supplied by developer environment manager 110 of service 100. Registration or integration includes supplying configuration information to the service 100, such as into a third-party application database 112 maintained by or accessible by the service 100. The configuration information includes, for example, a list of file types that the application is intended to open. Thus, when a developer registers a third-party application, they also register a list of file types that the application can operate on. The developer does this, in some implementations, by registering MIME types, file extensions, or both. These are application-to-file type (or application-to-MIME type) mappings, typically a one-to-many relationship.

Some third-party applications can operate on multiple file types or MIME types. For example, a photo editor might be able to operate on image/jpeg, image/png, or other file types. On the other hand, perhaps a third-party project management application could operate only on files which are associated with a custom file extension and MIME type. Such files may be, for example, files made with or for the third-party application.

Every third-party application typically receives its own file type or MIME type associated with its native file format. In some implementations, third-party developers register both MIME types and file extensions that their applications can handle. Similarly, documents or files created with one of these third-party applications can have the file type or MIME type of the application used to create the file. In addition to default file types of MIME types, third-party applications may allow export to any of a variety of file types or MIME types. This could be useful if a user 120, 121, or 122 wishes to use a file with a different type of application.

The developers 102, 104 also upload their applications 114, 116 to an application store shop 118, using their client devices 106, 108, such as via the developer environment manager or application program interface 110. The app store 118 may be hosted by, managed by, or controlled by the service 100 or may be independent. As used herein, the term "application store" may include, for example, a database as well as an interface providing a marketplace or storefront to users. The third-party applications 114 and 116 may subsequently be advertised or otherwise made available to and used by users. Applications may be free or paid.

System Overview

Users 120, 121, 122, etc. may discover or learn about the existence of a third-party application 114 or 116 through various discovery channels such as the application store 118, advertising, developer website, or a reference from another user. A user 120, 121, or 122 installs an application 114 on his or her device 124, 125, or 126 through a mechanism intended for such purpose, such as via user environment manager 128 or application program interface, integrating the application into the user's view of the service 100.

Installing an application is not to be confused with typical installation of software in which multiple files are copied to a user's hard drive or solid state drive and reside there until the software is uninstalled. Instead, an installed application is registered to a database that associates users with installed (registered) applications. A list of installed or registered applications is visible to a user when they use the service 100.

The act of "installing" the third-party application constitutes registering a relationship between a user and the third-party application, and acts as a step toward allowing the third-party application to access the user's resources on the service 100.

For example, the installed application 114 may controlled by a user's browser or other user interface, may be a temporary script or applet run by a user's browser (e.g., on Java™ or another platform-independent virtual machine), may be a plug-in to a user's browser, may be on a remote computer and remote controlled by a user's client machine 124, 125, 126, or otherwise accessed or controlled.

The application 114 is then available for the user to use to open files of applicable types in the service 100. Users 120, 121, and 122 will typically control, possess, or have access to files in data storage 130 in the service 100 or 132 outside the service 100 and are able to access such files using their respective client devices 124, 125, and 126 via a communication network 140, such as the Internet or other network. Files in the data storage 130 have file types such as MIME types or extensions or both.

In some implementations, the service 100 uses one or more of at least three ways to determine how to interpret a file:

1. Information in the header. In this implementation, the service looks into the file's contents to locate the header, parse it, and compare its structure and format to a database of known formats. For example, executable or .exe files start with a special code indicating their executability.

2. File extension, a property of the name of a file.

3. MIME type, part of accompanying external metadata not directly part of the file's contents (unless appearing in the header) and not part of the file name.

Client devices 124, 125, and 126 can be workstations, laptop computers, notebook computers, personal digital assistants, tablet computers, mobile phones, smart TVs, smart DVD or other media players, smart appliances, or other types of devices having human usable input and output interfaces, which are capable of being networked, and capable of opening files.

One of the users 120 may upload, for example, files 160 and 162 to the service 100 from their device 124. The files 160 and 162 are stored by the service, e.g., in data store or data storage 130. The user 120 may later access the files or share one or both of the files 160 and 162 with another of the users 121. The user 120, using their device 124, may edit, view, or otherwise interact with one of the files 160 using an application provided by the service 100. Thus, the user 120 does not need to purchase a traditional full copy of software to be able to edit, view or otherwise interact with the file 160.

The service 100 may also store user preferences in a user preference store or database 142. The service 100 may also maintain a list of installed applications for respective users 120, 121, 122 in installed applications lists 150. Installed applications for multiple users are typically maintained in the application store 118, if the store 118 is maintained by the service 100. Alternatively, applications may be kept by the service 100. Alternatively, applications may be kept outside the service 100, or a combination of both inside and outside. Instances of applications are deployed to users 120, 121, 122 from or by the service 100.

File Types

For a third-party software application 114 or 116 that stores data 130 in an application-specific native binary format (i.e., a "native" format), the network or Internet-based storage service 100 ensures that each application has assigned to it a single, perfectly unique file or MIME type to describe that application's native binary format. In conjunction with this unique file or MIME type, the service 100 ensures that a particular third-party application does not attempt to store binary data using the unique MIME type (i.e., the native format) of another third-party software application. By enforcing these storage service rules, the service 100 enforces a policy that a third-party software application with access to user data will not alter user data that the third-party software application did not originally create. As a result of these features, the service 100 has enhanced security.

In some implementations, applications database 112 of the service 100 contains a variety of information about software applications 114 and 116, including, for example: application title, supported MIME or file types, icon image, etc. Whenever a new software application 114, 116 is added to this database, a unique identifier (ID) for that application 114, 116 is automatically assigned by the database 112 or elsewhere in or outside service 100, such as using developer environment manager 110. In some implementations, the applications database 112 ensures or is queried to ensure that no two software applications are assigned the same identifier. The Internet-based storage service also generates a unique MIME type to represent the native file format for that new software application. In following the IETF standard MIME type assignment convention, an example MIME type for the native file format for a software application has the form: application/vnd.VENDOR.SERVICE_NAME.APPLICATION_ID where VENDOR is a placeholder for a company or vendor name, and SERVICE_NAME is a placeholder for a service name like "drive_sdk," and APPLICATION_ID is a placeholder for the application's unique identifier (id).

In accordance with IETF MIME type assignment convention, the application/vnd preamble indicates that everything after the preamble is defined by the third-party developer or vendor. As such, the vendor can decide the naming conventions and content of the MIME type string or file type string after the preamble. In this example, the suffix (last part following the last period) contains the unique identifier for the new third-party application 114 or 116. In other words, the APPLICATION_ID is replaced with the unique identifier for the new software application.

In addition to third-party applications 114 and 116, one or more system applications 210, 212, 214, and 216 may also be available to users 120, 121, and 122. The system applications may be basic applications such as word processor, spreadsheet, calendar, or presentation applications, for example. A single system application may be a default viewer able to open multiple types of conventional, non-third-party, files.

Figure 2:
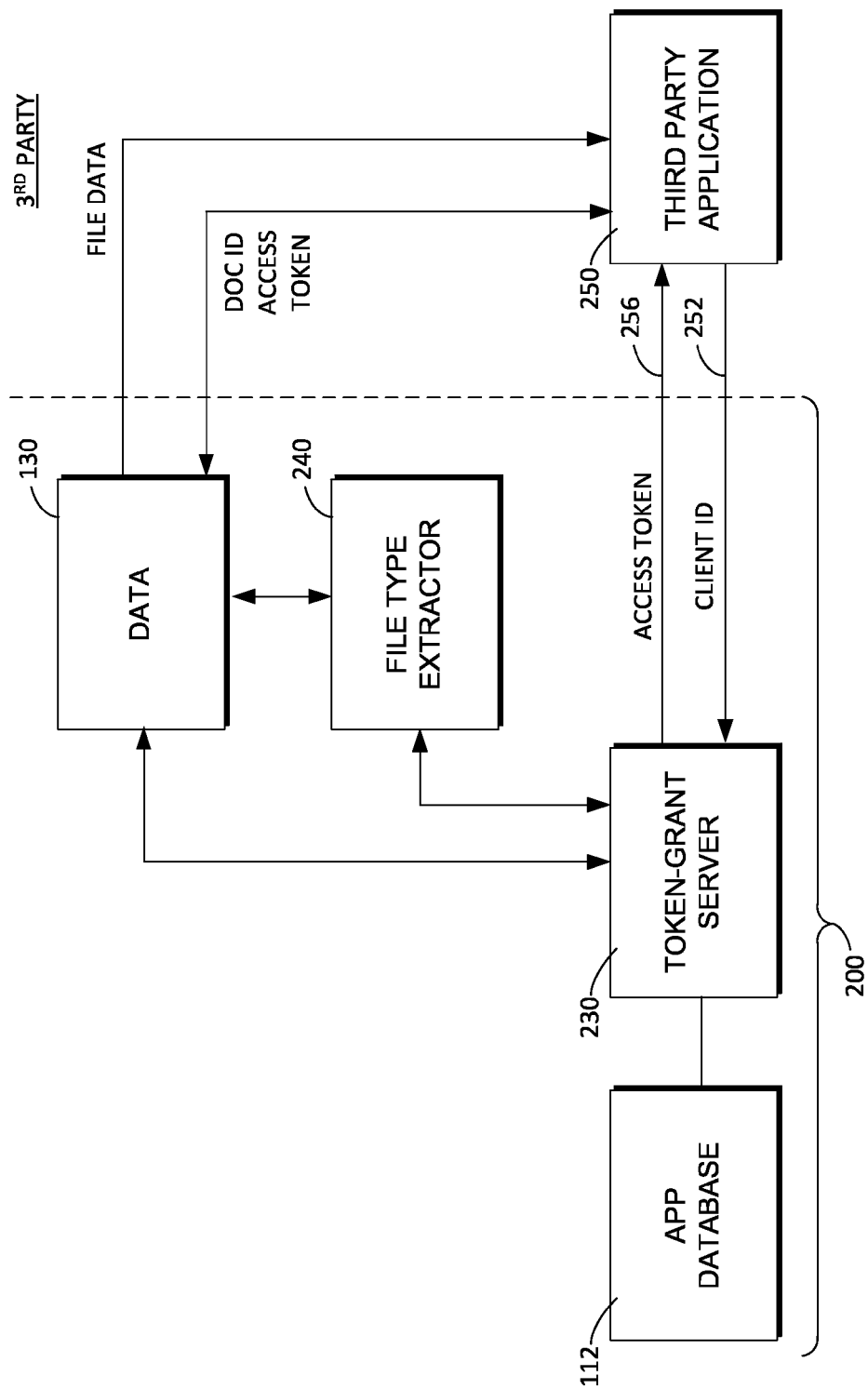
FIG. 2 is a schematic diagram of a more particular system for application-specific file type generation and use, including a token generator, in accordance with one or more implementations of the disclosure

FIG. 2 shows an example network storage service 200 that is similar to the service 100. In some implementations, the network storage service 200 has all the features of the service 100, but that has additional features that will be emphasized in connection with the description of FIG.

Tokens

In some implementations (see, e.g., FIG. 2), a third-party application 250 (which may correspond to one of the applications 114 or 116 of FIG. 1) is given access to the service 200 and can attempt to read, write, or create a file in data storage 130. As part of a file access request, the third-party application 250 makes a token-based request 252 to the service 200 for a specific file or data (e.g., to token-grant server 230). One such token-based method is OAuth 2.0 as defined by the IETF standards organization in "The OAuth 2.0 Authorization Protocol—draft-ietf-oauth-v2-23" dated Jan. 21, 2012 and available for download at http://tools.ietf.org/html/draft-ietf-oauth-v2-23.

As part of this token-based access request, the third-party application provides a client ID 254 to the service 200. This may be, in some implementations, a secret code known only to limited parties, such as to the third-party developer and the service 200. The service 200, such as using token-grant server 230, subsequently looks up an application ID associated with this client ID, such as in application database 112 or in a database specifically for third-party applications, or using data in the server 230 itself. This application database 112 contains software application descriptions with a variety of information about each software application, including, for example: application title, associated icon image, client ID, supported file or MIME types, and any associated application-specific IDs. As part of, or in response to, the same file access request 252, the file type or MIME type (including the application-specific ID) of the requested file is extracted, using file type extractor 240, from the requested file that has been stored in the user data store or storage 130 of the storage service 200. If the MIME type of the file conforms to the application/vnd.storage-service.drive-sdk.APPLICATION_ID pattern, the application-specific ID is extracted from the MIME type, such as by extractor 240.

The extracted application-specific ID is checked against the application-specific ID of the requesting third-party application 250. If the application-specific ID of the MIME type for the requested file does not match the application-specific ID of the requesting third-party application 250, the access request fails with a security violation and file access is denied to the third-party application 250. Otherwise, when the application-specific IDs do match, the third-party software application 250 is granted access 256 to the requested file. For example, the third-party software application 250 may access the file using an access token and document ID, in some implementations.

In some implementations, this security feature of checking for a match of application-specific IDs applies to third-party application-specific file formats. A third-party application requesting access to a file having a more common MIME type such as JPEG is given immediate access to it without going through an application-specific ID matching process.

Example Logic Flow

Figure 3:
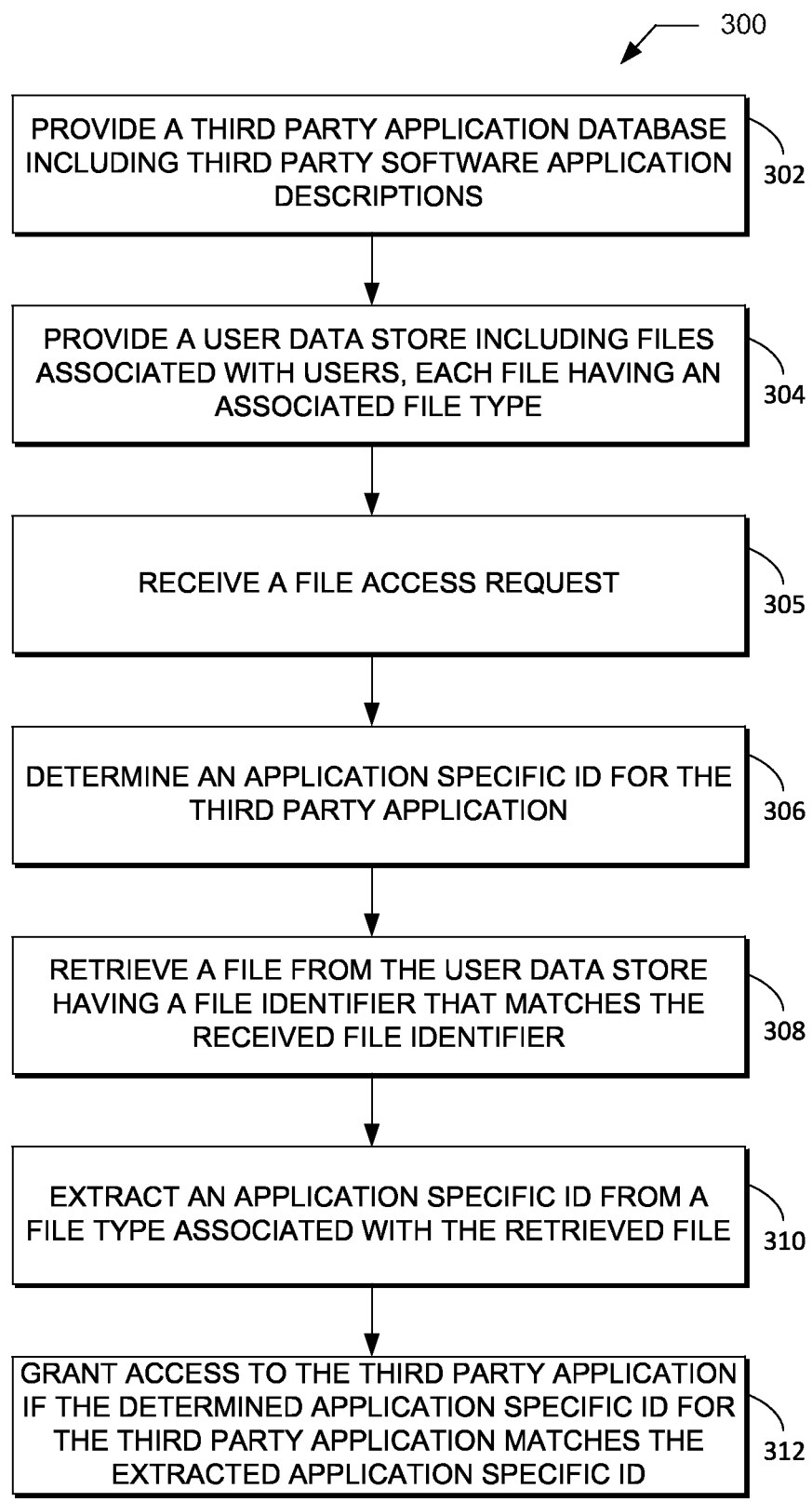
FIG. 3 is a flow chart of techniques employed in accordance with one or more implementations of the disclosure.

FIG. 3 shows an example workflow 300 employed in accordance with one or more generalized implementations. In 302, a third-party application database is provided including third-party software descriptions.

In 304, a user data store is provided including files associated with users. Each file in the user data store has an associated file type (e.g., MIME type).

In 305, a file access request by a third-party application is received. In 306, an application-specific ID is determined for the third-party application.

In 308, a file is retrieved or accessed from the user data store, which file has a file identifier that matches the file identifier of the access request.

In 310, an application-specific ID is extracted from a file type (e.g., MIME type) associated with the retrieved file.

In 312, access is granted to the third-party application if the determined application-specific ID for the third-party application matches the extracted application-specific ID.

Other Alternative Implementations

In some implementations, file extension information is used instead of a MIME type or file type to indicate the type of files a third-party application can open. An extension or MIME type or both are both stored as metadata or in a header or elsewhere inside a file generated by a third-party application.

Example Implementation

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 4:
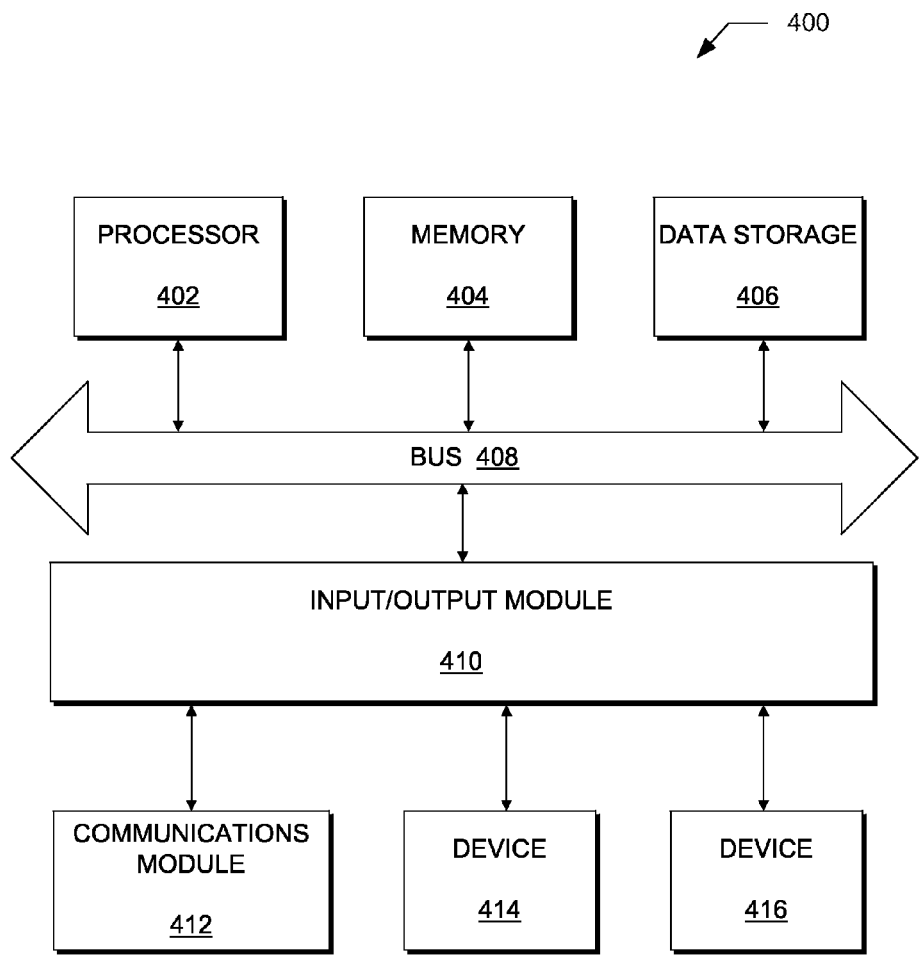
FIG. 4 is a schematic diagram of an exemplary computer system employed in accordance with one or more implementations of the disclosure.

FIG. 4 is a block diagram illustrating an exemplary computer system 400 with which the system for application-specific file type generation and use of FIGS. 1-2 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the service 100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via an input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the system for application-specific file type generation and use as shown in FIGS. 1-2, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the processes described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, an enterprise server or group of servers, one or more desktop computers, one or more laptop computers, etc. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A method that facilitates file access control of a network storage service, the method comprising:
   providing, on a network storage service, a third-party application database comprising a plurality of descriptions of third-party software applications configured to access files on the network storage service, wherein each respective third-party software application description:
   is registered by a respective third-party application developer, and
   includes application title, client ID, supported MIME types, and a unique application-specific ID,
   wherein the client ID included in each third-party software application description is:
   only known to the respective third-party application developer and a query processing component of the network storage service, and
   accessible by the third-party software application and the third-party application database;
   providing, on the network storage service, a user data store comprising files associated with users, each file within the user data store having an associated MIME type comprising an application-specific ID corresponding to an application which created the file, and a file identifier;
   receiving a file access request at the network storage service over a communication network from a third-party software application operating on a computing device, the file access request including a client ID for the third-party software application and a file identifier for a specific file;
   performing a query, by the query processing component, based on the file access request, in the third-party application database to select a particular third-party software application description from the plurality of descriptions based on the received client ID included in the file access request;
   determining a first application-specific ID for the selected third-party software application description;
   locating a file from the user data store having a file identifier that matches the received file identifier included in the file access request;
   extracting a second application-specific ID from a MIME type associated with the located file; and
   granting access to the requested specific file in the user data store to the third-party software application in response to a determination that the first application-specific ID associated with the selected third-party software application description matches the second application-specific ID from the MIME type associated with the located file.

2. The method according to claim 1 and further comprising denying access to the requested specific file in the user data store to the third-party software application in response to a determination that the first application-specific ID for the third-party software application does not match the second application-specific ID for the requested specific file.

3. The method according to claim 1 wherein the granting includes granting read-only access rights to the requested specific file to the third-party software application.

4. The method according to claim 1 wherein the granting includes granting modify access rights to the requested specific file to the third-party software application.

5. The method according to claim 1 and further comprising:
   receiving a file creation request at the storage service over the communication network from the third-party software application operating on the computing device, the file creation request including a second client ID for the third-party software application and MIME type for the file to be created, wherein:
   the MIME type comprises a third application-specific ID, and
   the second client ID for the third-party software application is available only to the third-party software application and the query processing component of the network storage service;
   determining a fourth application-specific ID for the third-party software application by performing a query in the third-party application database to select a particular third-party software application description from the plurality of descriptions that included the received client ID included in the file creation request; and
   granting permission to create a file to the third-party software application in response to a determination that the fourth application-specific ID for the third-party software application matches the third application-specific ID contained in the MIME type from the file creation request.

6. The non-transitory computer-readable media storing instructions that, when executed by a computing device, cause the computing device to perform operations that facilitate file access control of a network based file storage service, the operations comprising:
   providing, on a network storage service, a third-party application database having a plurality of descriptions of third-party software applications configured to access files on the network storage service, wherein each respective third-party software application description:
   is registered by a respective third-party application developer, and
   includes application title, client ID, supported MIME types, a unique application-specific ID,
   wherein the client ID included in each third-party software application description is:
   only known to the respective third-party application developer and a query processing component of the network storage service, and
   accessible by the third-party software application and the third-party application database;
   providing, on the network storage service, a user data store comprising files associated with users, each file within the user data store having an associated MIME type containing an application-specific ID corresponding to an application which created the file, and a file identifier;

receiving a file access request at the network storage service over a communication network from a third-party software application operating on a computing device, the file access request including a client ID for the third-party software application and a file identifier for a specific file;

performing a query, by the query processing component, based on the file access request, in the third-party application database to select a particular third-party software application description from the plurality of descriptions that includes the received client ID included in the file access request;

determining a first application-specific ID for the selected third-party software application description;

retrieving a file from the user data store having a file identifier that matches the received file identifier included in the file access request;

extracting a second application-specific ID from a MIME type associated with the retrieved file; and granting access to the requested specific file in the user data store to the third-party software application in response to a determination that the first application-specific ID associated with the selected third-party software application description matches the second application-specific ID from the MIME type associated with the retrieved file.

7. A non-transitory computer-readable media according to claim 6 wherein extracting an application-specific ID from the retrieved file comprises extracting an application-specific ID from the MIME type in the retrieved file.

8. A non-transitory computer-readable media according to claim 6, the operations further comprising denying access to the requested specific file in the user data store to the third-party software application in response to a determination that the first application-specific ID for the third-party software application does not match the second application-specific ID for the requested specific file.

9. The non-transitory computer-readable media according to claim 6 wherein the granting includes granting read-only access rights to the requested specific file to the third-party software application.

10. The non-transitory computer-readable media according to claim 6 wherein the granting includes granting modify access rights to the requested specific file to the third-party software application.

11. The non-transitory computer-readable media according to claim 6, the operations further comprising:

receiving a file creation request at the storage service over the communication network from the third-party software application operating on the computing device, the file creation request including a second client ID for the third-party software application and MIME type for the file to be created, wherein:

the MIME type comprises a third application-specific ID, and the second client ID for the third-party software application is available only to the third-party software application and the query processing component of the network storage service;

determining a fourth application-specific ID for the third-party software application by performing a query in the third-party application database to select a particular third-party software application description from the plurality of descriptions that included the received client ID included in the file creation request; and granting permission to create a file to the third-party software application in response to a determination that the fourth application-specific ID for the third-party software application matches the third application-specific ID contained in the MIME type from the file creation request.

12. A storage system providing file access control service, comprising:

a computer-implemented server operatively coupled to a communication network;

a third-party application database comprising a plurality of descriptions of third-party software applications configured to access files on the storage service, wherein each respective third-party software application description:

is registered by a respective third-party application developer, and includes application title, client ID, supported MIME types, a unique application-specific ID, wherein the client ID included in each third-party software application description is:

only known to the respective third-party application developer and a query processing component of the network storage service, and accessible by the third-party software application and the third-party application database;

a user data store comprising files associated with users, each file within the user data store having an associated MIME type containing an application-specific ID corresponding to an application which created the file, and a file identifier;

an application ID checker operative to receive a file access request at the storage service over the communication network from a third-party software application operating on a computing device, the file access request including a client ID for the third-party software application and a file identifier for a specific file, the application ID checker also operatively configured to perform a query, by the query processing component, in the third-party application database to select a particular third-party software application description from the plurality of descriptions based on the client ID included in the file access request, and determine a first application specific ID for the selected third-party application description;

a MIME type extractor operative to also receive the file access request and locate a file from the user data store having a file identifier that matches the received file identifier included in the file access request, the MIME type extractor also operatively configured to extract a second application-specific ID from a MIME type associated with the located file; and file access controller operative to grant access to the requested specific file in the user data store to the third-party software application in response to a determination that the first application-specific ID for the third-party software application associated with the selected third-party software application description matches the second application-specific ID from the MIME type associated with the located file.

13. The system according to claim 12 wherein the file access controller is operative to deny access to the requested specific file in the user data store to the third-party software application in response to a determination that the first application-specific ID for the third-party software application does not match the second application-specific ID for the located file.

14. The system according to claim 12 wherein the file access controller operative to grant access to the requested specific file is operative to grant, to the third-party software application, read-only access rights to the requested specific file.

15. The system according to claim 12 wherein the file access controller operative to grant access to the requested specific file is operative to grant, to the third-party software application, modify access rights to the requested specific file.

16. The system according to claim 12 and further operative to receive a file creation request over the communication network from the third-party software application, the file creation request including a client ID for the third-party software application and MIME type for the file to be created, the MIME type containing a third application-specific ID, wherein the client ID for the third-party software application is available only to the third-party software application and the network storage service;
the application ID checker being further operative to determine a fourth application-specific ID for the third-party software application by performing a query in the third-party application database to select a particular third-party software application description from the plurality of descriptions that includes the received client ID included in the file creation request; and
file access controller being operative to grant permission to create a file to the third-party software application in response to a determination that the third application-specific ID for the third-party software application matches the fourth application-specific ID contained in the MIME type from the file creation request.

17. A method of file access control of a network storage service, the method comprising:
providing, on the network storage service, a third-party application database comprising a plurality of descriptions of third-party software applications configured to access files on the network storage service, wherein each respective third-party software application description:
is registered by a respective third-party application developer, and
includes application title, client ID, supported MIME types, and a unique application-specific ID,
wherein the client ID included in each third-party software application description is:
only known to the respective third-party application developer and a query processing component of network storage service, and
accessible by the third-party software application and the network storage service;
providing, on the network storage service, a user data store comprising files associated with users, each file within the user data store having an associated MIME type string containing an application-specific ID corresponding to an application which created the file, and a file identifier;
receiving a file access request at the network storage service over a communication network from a third-party software application operating on a computing device, the file access request including a client ID for the third-party software application and a file identifier for a specific file;
performing a query, by the query processing component, based on the file access request, in the third-party software application database to select a particular third-party software application description from the plurality of descriptions based on the received client ID included in the file access request;
determining a first application-specific ID for the selected third-party software application description;
extracting a second application-specific ID from a MIME type string associated with a file in the user data store having a file identifier that matches the received file identifier from the file access request; and
granting access to the requested specific file in the user data store to the third-party software application in response to a determination that the first application-specific ID associated with the selected third-party software application description matches the second application-specific ID from the MIME type string associated with the file in the user data store having the file identifier that matches the received file identifier from the file access request.

18. The method according to claim 17 and further comprising denying access to the requested specific file in the user data store to the third-party software application in response to a determination that the first application-specific ID for the third-party software application does not match the second application-specific ID associated with the file in the user data store having the file identifier that matches the received file identifier from the file access request.

19. The method according to claim 17 wherein the granting includes granting read-only access rights to the requested specific file to the third-party software application.

20. The method according to claim 17 wherein the granting includes granting modify access rights to the requested specific file to the third-party software application.

21. The method according to claim 17 wherein extracting an application-specific ID from the requested specific file comprises extracting an application-specific ID from the MIME type in the requested specific file.

22. The method according to claim 17 and further comprising:
receiving a file creation request at the storage service over the communication network from the third-party software application operating on the computing device, the file creation request including a second client ID for the third-party software application and MIME type string for the to be created, wherein:
the MIME type string comprises a third application-specific ID, and
the second client ID for the third-party software application is available only to the third-party software application and the query processing component of the network storage service;
determining a fourth application-specific ID for the third-party software application by performing a query in the third-party application database to select a particular third-party software application description from the plurality of descriptions that included the received client ID included in the file creation request; and
granting permission to create a file to the third-party software application in response to a determination that the third second application-specific ID for the third-party software application matches the fourth application-specific ID contained in the MIME type string from the file creation request.

* * * * *